(12) United States Patent
Mitsui

(10) Patent No.: US 11,162,779 B2
(45) Date of Patent: Nov. 2, 2021

(54) IMAGE FORMING APPARATUS

(71) Applicant: CANON KABUSHIKI KAISHA, Tokyo (JP)

(72) Inventor: Yuji Mitsui, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 16/111,431

(22) Filed: Aug. 24, 2018

(65) Prior Publication Data

US 2019/0063901 A1 Feb. 28, 2019

(30) Foreign Application Priority Data

Aug. 31, 2017 (JP) .............................. JP2017-166875

(51) Int. Cl.
*B65H 7/20* (2006.01)
*G01B 11/06* (2006.01)
(Continued)

(52) U.S. Cl.
CPC ........... *G01B 11/0691* (2013.01); *B65H 5/36* (2013.01); *B65H 7/02* (2013.01); *B65H 7/20* (2013.01);
(Continued)

(58) Field of Classification Search
CPC ........ G01B 11/0691; B65H 5/36; B65H 7/00; B65H 7/02; B65H 7/06; B65H 7/12; B65H 7/125; B65H 7/14; B65H 7/20; G03G 15/5029; G03G 15/6514; G03G 2215/00721; G03G 2215/00738
See application file for complete search history.

(56) References Cited

U.S. PATENT DOCUMENTS 3,892,043 A * 7/1975 Bonikowski ......... G01D 5/2216
33/501.04
4,256,299 A * 3/1981 Hogenson ................ B65H 7/12
271/262
(Continued)

FOREIGN PATENT DOCUMENTS

JP 2007277011 A 10/2007
JP 2010058961 A 3/2010
(Continued)

OTHER PUBLICATIONS

Machine translation of JP 2015-9964. (Year: 2015).*

*Primary Examiner* — Thomas A Morrison
(74) *Attorney, Agent, or Firm* — Venable LLP

(57) ABSTRACT

The detection unit includes a first contact member, which comes into contact with a first surface of a recording material and a second contact member, which comes into contact with a second surface of the recording material, the first contact member and the second contact member being disposed so as to oppose each other thus being capable of nipping the recording material, and the first contact member and the second contact member are movable in a direction in which the first contact member and the second contact member nip the recording material, and is rotatable about an axis line extending in a predetermined direction, the predetermined direction being orthogonal to the direction in which the first contact member and the second contact member are movable and being orthogonal to a conveyance direction of the recording material.

17 Claims, 15 Drawing Sheets

(51) Int. Cl.
*G03G 15/00* (2006.01)
*B65H 7/02* (2006.01)
*B65H 5/36* (2006.01)

(52) U.S. Cl.
CPC ..... *G03G 15/5029* (2013.01); *G03G 15/6514* (2013.01); *B65H 2402/22* (2013.01); *B65H 2402/24* (2013.01); *B65H 2402/32* (2013.01); *B65H 2404/6111* (2013.01); *B65H 2511/13* (2013.01); *B65H 2511/414* (2013.01); *B65H 2511/416* (2013.01); *B65H 2553/30* (2013.01); *B65H 2553/81* (2013.01); *B65H 2801/06* (2013.01); *G01B 2210/46* (2013.01); *G03G 2215/00721* (2013.01); *G03G 2215/00738* (2013.01)

(56) References Cited

U.S. PATENT DOCUMENTS

| | | | | |
|---|---|---|---|---|
| 4,693,010 | A * | 9/1987 | Sills | B65H 7/125 33/501.03 |
| 5,303,912 | A * | 4/1994 | Blank | B65H 3/0833 271/262 |
| 5,704,246 | A * | 1/1998 | Kruger | G01B 5/06 209/900 |
| 6,615,017 | B2 * | 9/2003 | Tanaka | G03G 15/2028 399/322 |
| 7,343,689 | B2 | 3/2008 | Kondo | |
| 2007/0018383 | A1 * | 1/2007 | Ohara | B65H 7/12 271/262 |

FOREIGN PATENT DOCUMENTS

JP 2015-9964 * 1/2015
JP 2015009964 A 1/2015

\* cited by examiner

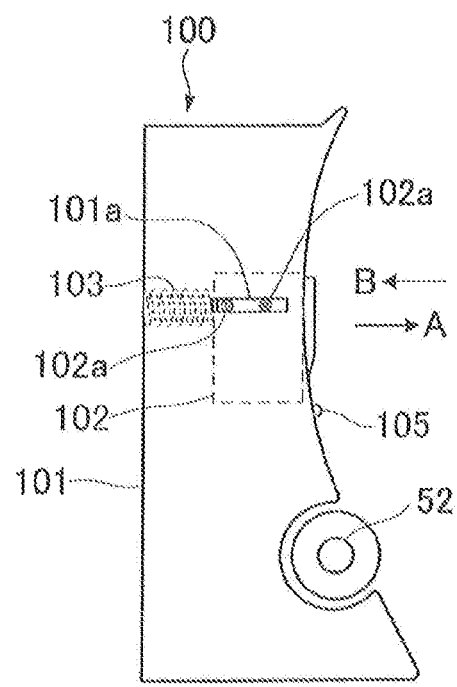

IMAGE FORMING APPARATUS

BACKGROUND OF THE INVENTION

Field of the Invention

The present invention relates to a configuration of a detection unit disposed at a conveyance part of an image forming apparatus.

Description of the Related Art

Recently, for an image forming apparatus such as a copier or a printer, a technique is proposed which can cope with various recording materials, and the technique enables printing conditions to be specifically set according to characteristics of various recording materials. A copier and a printer are also proposed which include a sensor for determining the type of a recording material so as to set these printing conditions.

As a sensor which determines the type of a recording material, an optical sensor is known where a light emission source is provided at a position which opposes a surface of a recording material, and light which is transmitted through the recording material is detected so as to determine the thickness of the recording material. Recently, sensors are also proposed which include a sensor which determines surface properties of a recording material by detecting light reflected on the surface of the recording material, and a sensor which determines the basic amount of a recording material using ultrasonic waves.

Japanese Patent Application Laid-Open No. 2015-009964 describes a sensor of a type which detects the above-mentioned transmitted light. The sensor is provided in a conveyance path for a recording material, and pinches a recording material under conveyance using two contact members. A light emission source is provided to one contact member, and a light receiving element is provided to the other contact member. Each of the two contact members is urged to a surface of a recording material by a spring. With such a configuration, followability of the sensor with respect to a recording material is enhanced thus increasing accuracy in detecting the thickness of a paper.

However, with the configuration of Japanese Patent Application Laid-Open No. 2015-009964, providing a sensor at a position where a conveyance path is curved causes a recording material, having the width of the conveyance path, to incline in the thickness direction of the recording material when the recording material has a high rigidity. Due to such inclination, the contact member separates from the surface of the recording material so that followability of the sensor degrades and, as a result, detection accuracy of the sensor also degrades. As a countermeasure to such degradation, a configuration is considered where a pressing force of the springs which urge the contact members is increased to an extent that the pressing force of the springs overcomes a rigidity of a recording material. However, when a recording material having a low rigidity is used, there may be a case where a distal end of the recording material cannot enter a sensor nip formed by two contact members. There may be also a case where a large impact is applied to a recording material when a rear end of the recording material is released from the sensor nip thus affecting image formation. The configuration described in Japanese Patent Application Laid-Open No. 2015-009964 can widely cope with types of recording materials used at the time. Recently, however, with the increase in types of recording materials used, there has been a demand for further enhancement of followability of the sensor.

SUMMARY OF THE INVENTION

In view of the above, an aspect of the present invention is an image forming apparatus and a recording material determination apparatus to enhance followability of a sensor with respect to a recording material.

Another aspect of the present invention is an image forming apparatus including an image forming unit configured to form an image on a recording material, a detection unit configured to detect information on characteristics of the recording material, and a control unit configured to set an image forming condition of the image forming unit based on the information on the characteristics of the recording material detected by the detection unit, wherein the detection unit includes a first contact member configured to come into contact with a first surface of the recording material, and a second contact member configured to come into contact with a second surface of the recording material, the first contact member and the second contact member opposing with each other to be capable of nipping the recording material, and wherein the first contact member and the second contact member are movable in a direction in which the first contact member and the second contact member nip the recording material, and rotatable about an axis line extending in a predetermined direction, the predetermined direction being orthogonal to the direction in which the first contact member and the second contact member are movable and being orthogonal to a conveyance direction of the recording material.

A further aspect of the present invention is a recording material determination apparatus including a detection unit configured to detect information on characteristics of the recording material, and a control unit configured to determine a type of the recording material based on the information on the characteristics of the recording material detected by the detection unit, wherein the detection unit includes a first contact member configured to come into contact with a first surface of the recording material, and a second contact member configured to come into contact with a second surface of the recording material, the first contact member and the second contact member opposing with each other to be capable of nipping the recording material, and wherein the first contact member and the second contact member are movable in a direction in which the first contact member and the second contact member nip the recording material, and rotatable about an axis line extending in a predetermined direction, the predetermined direction being orthogonal to the direction in which the first contact member and the second contact member are movable and being orthogonal to a conveyance direction of the recording material.

Further features of the present invention will become apparent from the following description of exemplary embodiments with reference to the attached drawings.

BRIEF DESCRIPTION OF THE DRAWINGS

FIG. 2A, FIG. 2B, FIG. 2C, FIG. 2D and FIG. 2E are configuration diagrams of a sensor guide unit according to the exemplary embodiment 1.

DESCRIPTION OF THE EMBODIMENTS

Preferred embodiments of the present invention will now be described in detail in accordance with the accompanying drawings.

Hereinafter, a mode for carrying out the present invention is exemplarily described in detail based on exemplary embodiments with reference to drawings. Sizes, materials, shapes, the relative arrangement and the like of the constitutional elements described in the exemplary embodiments are suitably changed depending on the configuration of the apparatus to which the present invention is applied and various conditions. That is, the scope of the present invention is not limited to the following exemplary embodiments.

Exemplary Embodiment 1

<Description of Overall Configuration>

Figure 1:
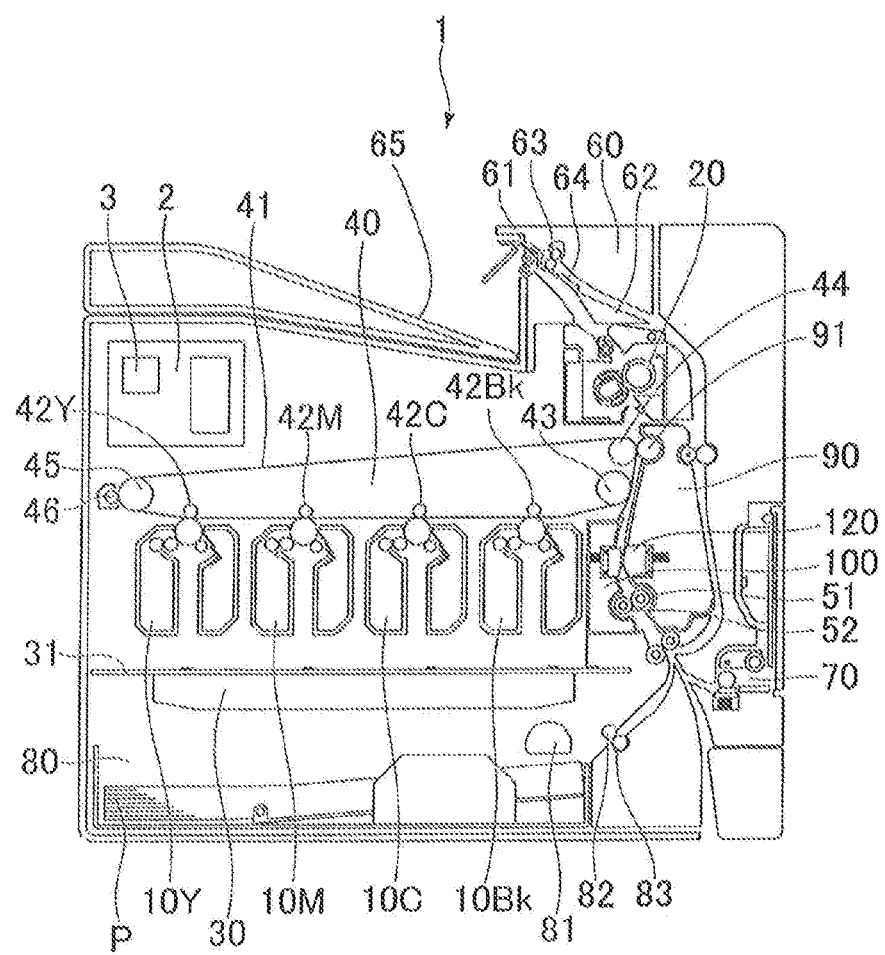
FIG. 1 is a cross-sectional view of an overall configuration of a full-color laser beam printer of an exemplary embodiment 1.

First, a summary of an overall configuration of an image forming apparatus 1 is described with reference to FIG. 1. FIG. 1 is a longitudinal cross-sectional view illustrating an overall configuration of a full-color laser beam printer which is one mode of an image forming apparatus according to this exemplary embodiment. Assume that a user opposedly faces the surface of the image forming apparatus illustrated in FIG. 1 on which four process cartridges described later are arranged. In that case, a cassette paper feeding unit 80 is disposed on a lowermost stage of the image forming apparatus, and a manual paper feeding unit 70 is disposed on a right portion of the image forming apparatus. A registration roller 51 and an opposing registration roller 52 are disposed above the cassette paper feeding unit 80, and the registration roller 51 and the opposing registration roller 52 perform positioning of a distal end of a recording material P and convey the recording material P. In the same manner, a laser scanner unit 30 is disposed above the cassette paper feeding unit 80, and the laser scanner unit 30 forms an electrostatic latent image on a photoreceptor. A scanner frame 31 is disposed directly above the laser scanner unit 30, and the laser scanner unit 30 is fixed to the scanner frame 31. A sensor guide unit 100 is disposed in the vicinity of the registration roller 51 and the opposing registration roller 52. The four process cartridges 10 (10Y, 10M, 10C, 10Bk) are disposed above the scanner frame 31. An intermediate transfer unit 40 is disposed above the process cartridges 10 (10Y, 10M, 10C, 10Bk) so as to oppose the process cartridges 10 (10Y, 10M, 10C, 10Bk). The intermediate transfer unit 40 includes an intermediate transfer belt 41. The intermediate transfer unit 40 includes primary transfer rollers 42 (42Y, 42M, 42C, 42Bk), a drive roller 43, an opposing secondary transfer roller 44, and a tension roller 45 on the inside of the intermediate transfer belt 41, and includes a cleaning unit 46 on the outside of the intermediate transfer belt 41.

A secondary transfer unit 90 is disposed on the right side of the intermediate transfer unit 40. A secondary transfer roller 91 is provided to the secondary transfer unit 90 so as to oppose the opposing secondary transfer roller 44. A secondary-transfer-side sensor unit 120 is also provided in the inside of the secondary transfer unit 90 so as to oppose the sensor guide unit 100. A fixing unit 20 is disposed above the intermediate transfer unit 40 and the secondary transfer unit 90. A paper discharge unit 60 is disposed at an upper left position of the fixing unit 20. The paper discharge unit 60 includes a sheet discharge roller pair 61, a double-sided sheet conveying part 62, a reverse roller pair 63, and a double-sided sheet flapper 64 forming a branching unit. A CPU 3 is mounted on an image forming control part 2, and the CPU 3 collectively controls image forming operation of the image forming apparatus 1.

<Description of Printing Operation>

When print data containing a printing command, image information and the like is input into the image forming control part 2 from a host computer not shown in the drawing, the image forming apparatus 1 starts printing operation. A recording material P is fed from the cassette paper feeding unit 80 by a feeding roller 81, a conveyance roller 82 and an opposing conveyance roller 83 thus being sent to a conveyance path. In forming an image on a first recording material P, the recording material P is stopped temporarily on an upstream side of the secondary transfer roller 91 for synchronization between a forming operation of an image to be formed on the intermediate transfer belt 41 and a conveyance timing. The recording material P is stopped in a state where the recording material P is pinched between the registration roller 51 and the opposing registration roller 52. The recording material P is held in a standby state until image formation is finished and, thereafter, is conveyed. A second or further recording material P is continuously conveyed without being temporarily stopped. In synchronization with operation of feeding the recording material P, developer images for respective colors which are developed by the process cartridges (10Y, 10M, 10C, 10Bk) are sequentially transferred to the intermediate transfer belt 41 for each respective color. The developer images (color images) which are developed in a multi-layered manner on the intermediate transfer belt 41 are moved to the position of the opposing secondary transfer roller 44 in conformity with the intermediate transfer belt 41. Conveyance of the recording material P which is temporarily stopped is started with the rotation of the registration roller 51 and the opposing registration roller 52. Causing the recording material P to enter a nip portion between the secondary transfer roller 91 and the intermediate transfer belt 41 in conformity with the developer images allows secondary transfer to be performed on the recording material P. The color image transferred onto the recording material P is heated and compressed by the fixing unit 20 formed of a fixing roller and the like thus being melted and fixed onto the recording material P. The recording material P onto which the image is fixed is discharge to a paper discharge tray 65 by the sheet discharge roller pair 61. With such operations, color image forming operation is finished. Further, the cleaning unit 46 is disposed on the intermediate transfer belt 41. The cleaning unit 46 scrapes developer remaining on the intermediate transfer belt by a cleaning member such as a cleaning blade disposed inside the cleaning unit 46 so as to prepare for the next image formation.

<Description of Configuration of Sensor Guide Unit>

Figure 2B:
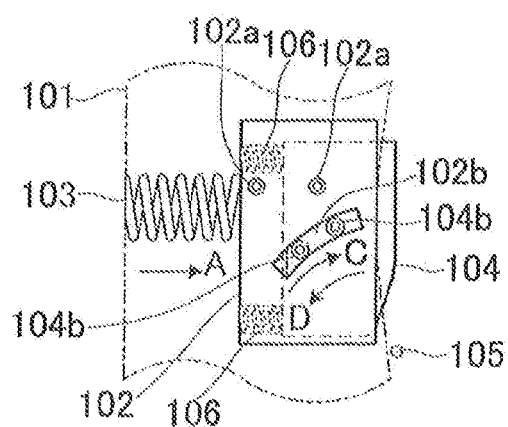

FIG. 2A to FIG. 2E are views of the sensor guide unit 100 in this exemplary embodiment. As illustrated in FIG. 2A, a sensor holder guide 102 is installed inside a conveyance guide 101 which guides a recording material P. A groove 101*a* is formed on the conveyance guide 101, and two protrusions 102*a* are formed on the sensor holder guide 102. In this embodiment, the sensor holder guide 102 is installed such that the two protrusions 102*a* are inserted into the groove 101*a* so that the sensor holder guide 102 is movable in directions indicated by arrows A, B along the groove 101*a*.

FIG. 2B is a view of the sensor holder guide 102. As illustrated in FIG. 2B, a spring 103 is disposed between the conveyance guide 101 and the sensor holder guide 102. The spring 103 pushes the sensor holder guide 102 (first support member) in the direction indicated by arrow A, and holds the sensor holder guide 102 such that a position of a sensor holder 104 can be varied. Two protrusions 104*b* are formed on the sensor holder 104 (first contact member) supported in the sensor holder guide 102, and a groove 102*b* is formed on the sensor holder guide 102. The two protrusions 104*b* are inserted into the groove 102*b*. When the groove 102*b* is viewed in the direction of an axis, the groove 102*b* is formed as if the groove 102*b* draws an arc shape about an imaginary swing center 105 disposed on an upstream side in the conveyance path for the recording material P. With such a configuration, the two protrusions 104*b* are operated (slid) while being guided by the groove 102*b* so that the sensor holder 104 is rotationally movable (swingable) in directions indicated by arrows C, D using the swing center 105 as a rotation axis (swing axis).

Figure 2C:
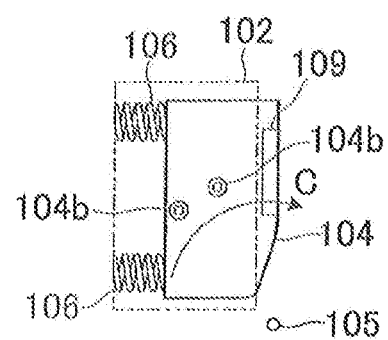
Figure 2D:
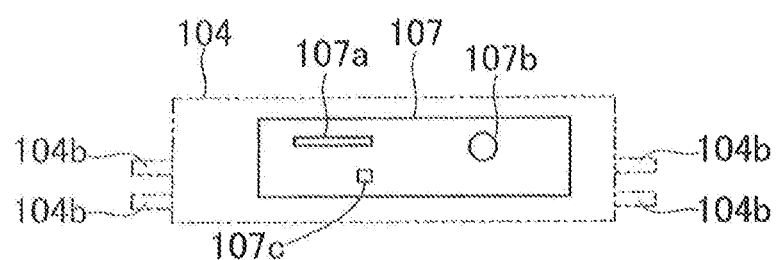

FIG. 2C is a view of the sensor holder 104. As illustrated in FIG. 2C, springs 106 are disposed between the sensor holder guide 102 and the sensor holder 104, and push the sensor holder 104 in a direction indicated by arrow C. FIG. 2D is a view of the sensor holder 104 as viewed from the secondary-transfer-side sensor unit 120 side. As illustrated in FIG. 2D, a sensor electronic board 107 is installed to the sensor holder 104, and the sensor electronic board 107 detects characteristics of a recording material P from surface properties and basic amount information of a recording material P. A line sensor 107*a*, an LED 107*c* and an ultrasonic receiving part 107*b* are disposed on the sensor electronic board 107. The line sensor 107*a* and the LED 107*c* form a surface property detection part, and the ultrasonic receiving part 107*b* forms a basic amount detection part.

Figure 2E:
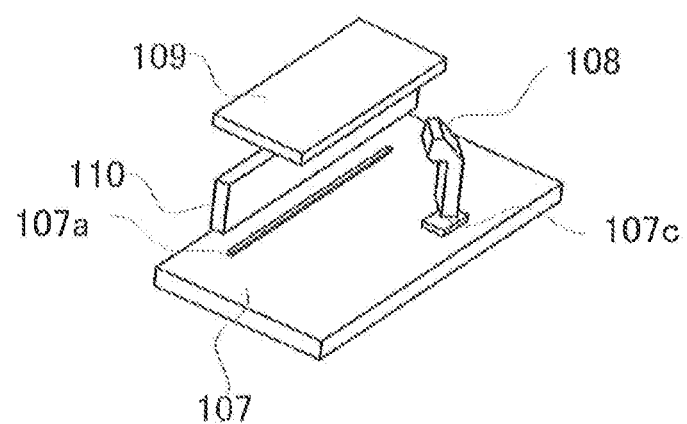

The line sensor 107*a* (acted portion) and the LED 107*c* (acting portion) image a surface image of a recording material P in cooperation so as to detect surface properties of the recording material P. That is, the line sensor 107*a* and the LED 107*c* form the surface property detection part. FIG. 2E is a perspective view of the surface property detection part. Light emitted from the LED 107*c* is polarized by a polarizer 108, passes through a transparent glass member 109, and is incident on the surface of the recording material P from an oblique direction. The light reflected on the surface of the recording material P is condensed by a condensing element 110, and is imaged by the line sensor 107*a*. The line sensor 107*a* is an imaging element which extends along a direction orthogonal to a conveyance direction of a recording material P (along the width direction of the recording material P). The line sensor 107*a* performs the imaging a plurality of times while the recording material P is conveyed. The CPU 3 acquires a feature amount from a surface image of the recording material P obtained as described above thus detecting surface properties of the recording material P. It can be considered to use a difference value between output values of a plurality of pixels as a feature amount, for example. The CPU 3 determines that the recording material P is a recording material having a smooth surface when the difference value is small, while the CPU 3 determines that the recording material P is a recording material having a coarse surface when the difference value is large. A method for detecting surface properties of a recording material P is not limited to such a method. For example, one light receiving element is disposed in place of the imaging element, and surface properties of a recording material P may be detected based on the degree of amount of reflected light which is received by the light receiving element. The CPU 3 determines that the recording material P is a recording material having a smooth surface when an amount of reflected light is large, while the CPU 3 determines that the recording material P is a recording material having a coarse surface when an amount of reflected light is small.

<Description of Configuration of Secondary-Transfer-Side Sensor Unit>

Figure 3A:
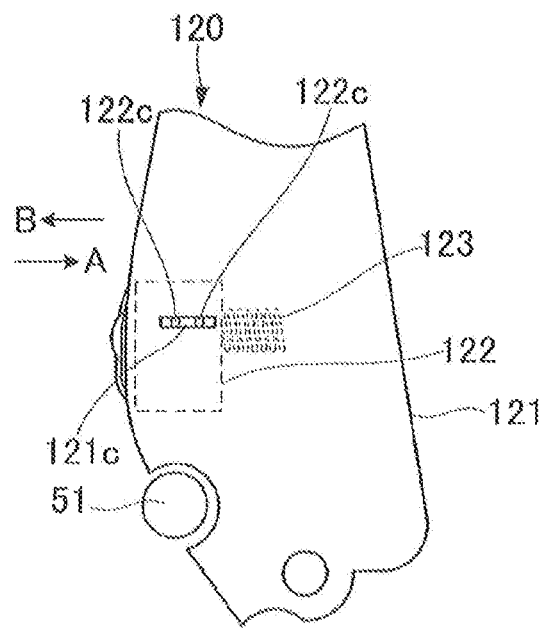
FIG. 3A, FIG. 3B, FIG. 3C and FIG. 3D are configuration diagrams of a secondary-transfer-side sensor unit according to the exemplary embodiment 1.

FIG. 3A to FIG. 3D are views of the secondary-transfer-side sensor unit 120. As illustrated in FIG. 3A, a secondary-transfer-side sensor holder guide 122 is installed inside a secondary-transfer-side conveyance guide 121 which guides a recording material P. A groove 121*c* is formed on the secondary-transfer-side conveyance guide 121, and two protrusions 122*c* are formed on the secondary-transfer-side sensor holder guide 122. In this embodiment, the secondary-transfer-side sensor holder guide 122 is installed such that the two protrusions 122*c* are inserted into the groove 121*c* so that the secondary-transfer-side sensor holder guide 122 is movable in the directions indicated by arrows A, B along the groove 121*c*.

Figure 3B:
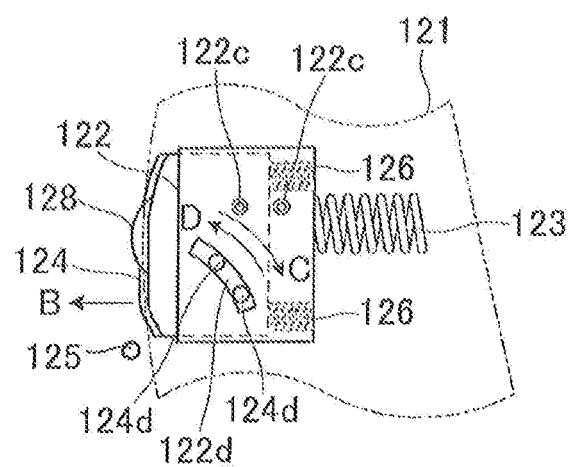

FIG. 3B is a view of the secondary-transfer-side sensor holder guide 122. As illustrated in FIG. 3B, a spring 123 is disposed between the secondary-transfer-side conveyance guide 121 and the secondary-transfer-side sensor holder guide 122, and pushes the secondary-transfer-side sensor holder guide 122 (second support member) in a direction indicated by arrow B. The spring 123 holds the secondary-transfer-side sensor holder guide 122 such that the position of a secondary-transfer-side sensor holder 124 can be varied. Two protrusions 124*d* are formed on the secondary-transfer-side sensor holder 124 (second contact member) supported in the secondary-transfer-side sensor holder guide 122, and a groove 122*d* is formed on the secondary-transfer-side sensor holder guide 122. The two protrusions 124*d* are inserted into the groove 122*d*. When the groove 122*d* is viewed in the direction of an axis, the groove 122*d* is formed as if the groove 122*d* draws an arc shape about an imaginary swing center 125 disposed on an upstream side in the conveyance path for the recording material P. With such a configuration, the two protrusions 124*d* are operated (slid) while being guided by the groove 122*d* so that the secondary-transfer-side sensor holder 124 is rotationally movable (swingable) in the directions indicated by arrows C, D using the swing center 125 as a rotation axis (swing axis).

Figure 3C:
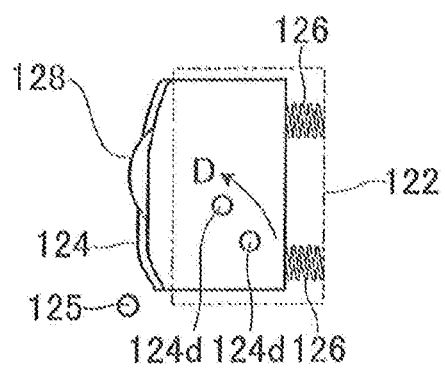
Figure 3D:
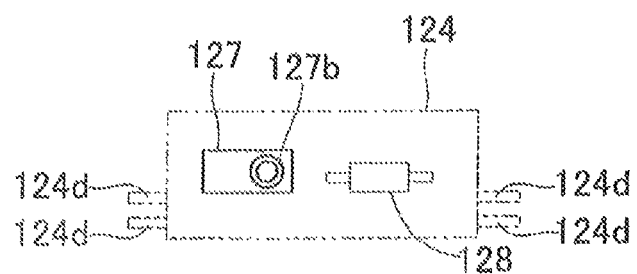

FIG. 3C is a view of the secondary-transfer-side sensor holder 124. As illustrated in FIG. 3C, springs 126 are disposed between the secondary-transfer-side sensor holder guide 122 and the secondary-transfer-side sensor holder 124, and push the secondary-transfer-side sensor holder 124 in a direction indicated by arrow D. FIG. 3D is a view of the secondary-transfer-side sensor holder 124 as viewed from the sensor guide unit 100 side. As illustrated in FIG. 3D, an ultrasonic transmitting part 127*b* (acting portion) and a driven roller 128 are disposed on the secondary-transfer-side sensor holder 124. The ultrasonic transmitting part 127*b* detects (acquires) basic amount information of a recording material P. In this embodiment, the ultrasonic transmitting part 127*b* is disposed at the position which opposes the ultrasonic receiving part 107*b* (acted portion) disposed on the sensor holder 104 with the conveyance path interposed therebetween. The driven roller 128 is disposed at the position which opposes the surface property detection part disposed on the sensor holder 104 with the conveyance path interposed therebetween, and the driven roller 128 rotates with the conveyance of a recording material P. The driven roller 128 pushes a recording material P against the glass member 109 disposed on the sensor holder 104 thus preventing flapping of the recording material P when the recording material P is conveyed. With such a configuration, the line sensor 107*a* can image a surface image without blurring. The swing center 105 of the sensor holder 104 and the swing center 125 of the secondary-transfer-side sensor holder 124 are disposed adjacent to each other. With such a configuration, when the sensor holder 104 and the secondary-transfer-side sensor holder 124 respectively swing, it is possible to prevent deviation of the relative position between the ultrasonic receiving part 107*b* and the ultrasonic transmitting part 127*b*, and the relative position between the surface property detection part and the driven roller 128.

The ultrasonic transmitting part 127*b* and the ultrasonic receiving part 107*b* transmit and receive ultrasonic waves in cooperation with the conveyance path for the recording material P interposed therebetween thus forming the basic amount detection part which detects the basic amount of a recording material P. In this embodiment, a basic amount means a mass per unit area of a recording material P, and is expressed in [g/m$^2$]. The ultrasonic transmitting part 127*b* and the ultrasonic receiving part 107*b* have substantially the same configuration, and are respectively formed of a piezoelectric element (also referred to as "piezo element") and an external electrode terminal. The piezoelectric element is an element which mutually converts a mechanical displacement and an electrical signal. Inputting a pulse voltage of a predetermined frequency into the external electrode terminal of the ultrasonic transmitting part 127*b* causes the piezoelectric element to oscillate thus generating ultrasonic waves. The ultrasonic waves propagate through air. When the ultrasonic waves arrive at a recording material P, the recording material P vibrates due to the ultrasonic waves. As described above, the ultrasonic waves generated in the ultrasonic transmitting part 127*b* propagate to the ultrasonic receiving part 107*b* through the recording material P. The piezoelectric element of the ultrasonic receiving part 107*b* causes the external electrode terminal to generate an output voltage which corresponds to amplitude of the received ultrasonic waves depending on the basic amount. The CPU 3 determines the basic amount of the recording material P based on a peak value of an output voltage value. For example, a recording material P having a small basic amount has a large peak value, while a recording material P with a large basic amount has a small peak value.

The image forming control part 2 determines the type of recording material P based on a detection result obtained by the surface property detection part and the basic amount detection part, and controls conditions in forming an image on a recording material P. In this embodiment, to control conditions in forming an image has the meaning of, depending on the type of the recording material P, varying conveyance speed of a recording material P, varying a voltage to be applied to the secondary transfer roller 91 at the time of transferring an image, or varying a heating temperature or a compression force of the fixing unit 20.

In this exemplary embodiment, as described above, the type of recording material P is determined by detecting surface properties of a recording material P using the surface property detection part detects, and by detecting the basic amount of the recording material P using the basic amount detection part. However, a configuration may include only either one of the surface property detection part and the basic amount detection part. Further, a detection part may detect other characteristics of a recording material P instead of surface properties and the basic amount of a recording material P. For example, a configuration may be adopted where a light emitting unit which emits light is provided to the secondary-transfer-side sensor holder 124, and a light receiving element (light receiving unit), which receives transmitted light which is transmitted through a recording material P, is provided to the sensor holder 104, and the thickness of the recording material P is detected based on an amount of transmitted light. In this case, the CPU 3 determines that the recording material P is a thin pater when an amount of transmitted light is large, while the CPU 3 determines that the recording material P is a thick paper when an amount of transmitted light is small.

<Description of Operation of Sensor Guide Unit and Secondary-Transfer-Side Sensor Unit>

Figure 4:
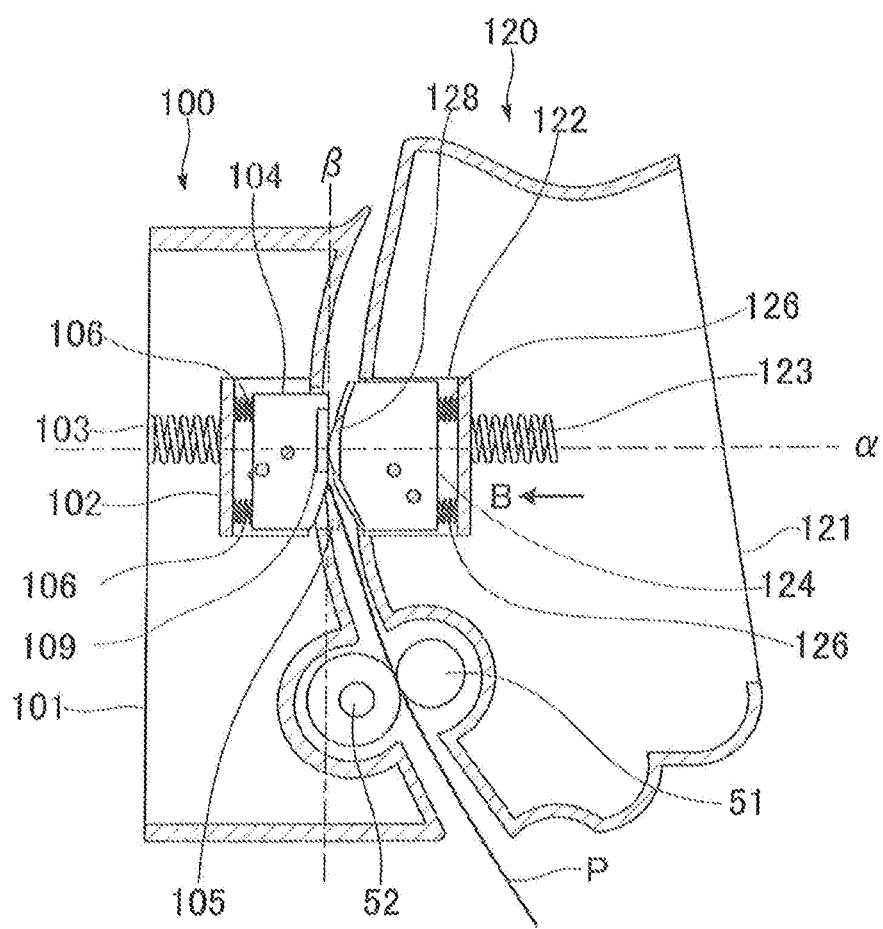
FIG. 4 is a view of respective units before printing is performed on a recording material having a low rigidity in the exemplary embodiment 1.

FIG. 4 is a cross-sectional view of the sensor guide unit 100 and the secondary-transfer-side sensor unit 120 in a standby state before printing is performed on a recording material. As illustrated in FIG. 4, in the standby state, the sensor holder 104 and the secondary-transfer-side sensor holder 124 are in touch with each other. In this state, a pressing force of the spring 123 is larger than a pressing force of the spring 103 so that the spring 123 and the spring 103 are balanced in a state where the sensor holder guide 102 is biased in the direction indicated by arrow B. For example, the sensor holder 104 and the secondary-transfer-side sensor holder 124 come in touch with each other at a nip portion formed by the glass member 109 and the driven roller 128.

Figure 5:
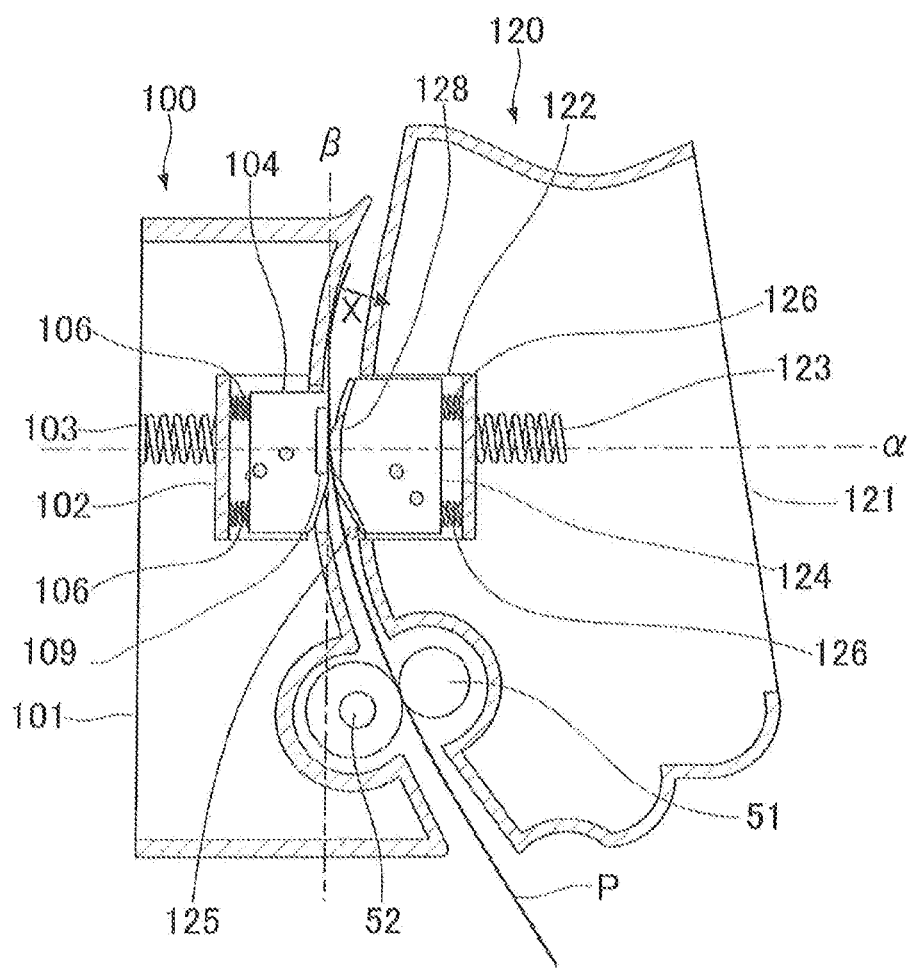
FIG. 5 is a view of the respective units when the recording material having a low rigidity passes through a contact portion in the exemplary embodiment 1.

First, a case where a recording material P has a low rigidity, for example, a case of a recycled paper or a recording material having a small basic amount is described with reference to FIGS. 4 to 6. As described above, FIG. 4 is a cross-sectional view of the sensor guide unit 100 and the secondary-transfer-side sensor unit 120 in the standby state before printing is performed on a recording material, and is also a view illustrating a state before a recording material P having a low rigidity passes through a contact portion between the sensor holder 104 and the secondary-transferside sensor holder 124. The recording material P is conveyed by the registration roller 51 and the opposing registration roller 52, and comes in touch with the sensor holder 104 first. The sensor holder 104 is installed to the sensor holder guide 102 in a rotationally movable manner using the swing center 105 as an axis of rotation. However, since the recording material P has a low rigidity, the recording material P cannot overcome the pressing force of the springs 106 so that the sensor holder 104 does not rotationally move. The recording material P is conveyed to the touch portion (contact portion) between the sensor holder 104 and the secondary-transfer-side sensor holder 124 as it is. FIG. 5 illustrates a state of the sensor guide unit 100 and the secondary-transfer-side sensor unit 120 when the recording material P having a low rigidity passes through the contact portion between the sensor holder 104 and the secondary-transfer-side sensor holder 124. The sensor holder 104 (first contact member) comes into contact with one surface of the recording material P, and the secondary-transfer-side sensor holder 124 (second contact member) comes into contact with the other surface of the recording material P thus pinching the recording material P. At this point of operation, the recording material P is pinched by the nip portion formed by the glass member 109 on the sensor holder 104 side and the driven roller 128 on the secondary-transfer-side sensor holder 124 side. When the recording material P is conveyed beyond the touch portion (contact portion) between the sensor holder 104 and the secondary-transfer-side sensor holder 124 thus coming in touch with the conveyance guide 101, the secondary-transfer-side sensor holder 124 receives a reaction force from the recording material P in a direction indicated by arrow X. However, since the recording material P has a low rigidity, a reaction force is also small. Accordingly, the recording material P is conveyed in a state where the sensor holder 104 and the secondary-transfer-side sensor holder 124 are maintained in the standby state by the pressing force of the spring 123. That is, the recording material P is conveyed in a state where the sensor holder 104 and the secondary-transfer-side sensor holder 124 maintain the attitudes in the same attitudes as before the recording material P passes through the contact portion between the sensor holder 104 and the secondary-transfer-side sensor holder 124.

Figure 6:
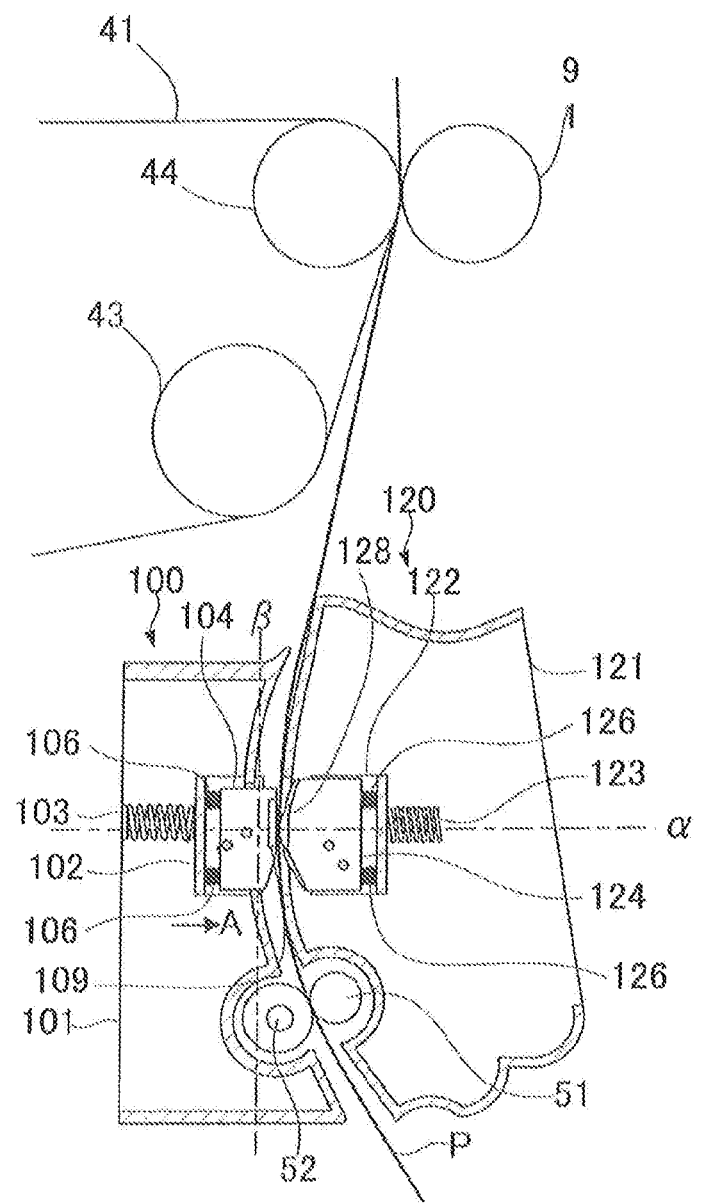
FIG. 6 is a view of the respective units after the recording material having a low rigidity passes through the contact portion in the exemplary embodiment 1.

FIG. 6 illustrates a state of the sensor guide unit 100 and the secondary-transfer-side sensor unit 120 after the recording material P having a low rigidity passes through the touch portion (contact portion) between the sensor holder 104 and the secondary-transfer-side sensor holder 124. The recording material P arrives at the transfer nip portion formed by the intermediate transfer belt 41 and the secondary transfer roller 91. In this state, a rear end portion of the recording material P is still nipped by the registration roller 51 and the opposing registration roller 52. At this point of operation, causing the registration roller 51 and the opposing registration roller 52 to convey the recording material P at a speed higher than the speed of the intermediate transfer belt 41 and the secondary transfer roller 91 allows a loop to be formed on the recording material P. However, to avoid a state where the loop becomes excessively large, causing the recording material P to be rubbed by the conveyance guide 101 or the secondary-transfer-side conveyance guide 121, the registration roller 51 and the opposing registration roller 52 adjust the conveyance speed of the recording material P. That is, the registration roller 51 and the opposing registration roller 52 may convey a recording material P at a speed equal to or lower than the speed of the intermediate transfer belt 41 and the secondary transfer roller 91. In a state illustrated in FIG. 6, when the speed of the intermediate transfer belt 41 and the secondary transfer roller 91 is equal to or lower than the speed of the registration roller 51 and the opposing registration roller 52, the attitude of the recording material P does not change. On the other hand, when the speed of the intermediate transfer belt 41 and the secondary transfer roller 91 is higher than the speed of the registration roller 51 and the opposing registration roller 52, the loop formed on the recording material P is gradually reduced in size. With the reduction in size of the loop, the recording material P moves in the direction indicated by arrow A while being pinched by the sensor holder 104 and the secondary-transfer-side sensor holder 124. Also at this point of operation, since the recording material P has a low rigidity, the sensor holder 104 and the secondary-transfer-side sensor holder 124 receive a small reaction force. Accordingly, the sensor holder 104 and the secondary-transfer-side sensor holder 124 move in the direction indicated by arrow A while continuously maintaining the same attitude.

Figure 7:
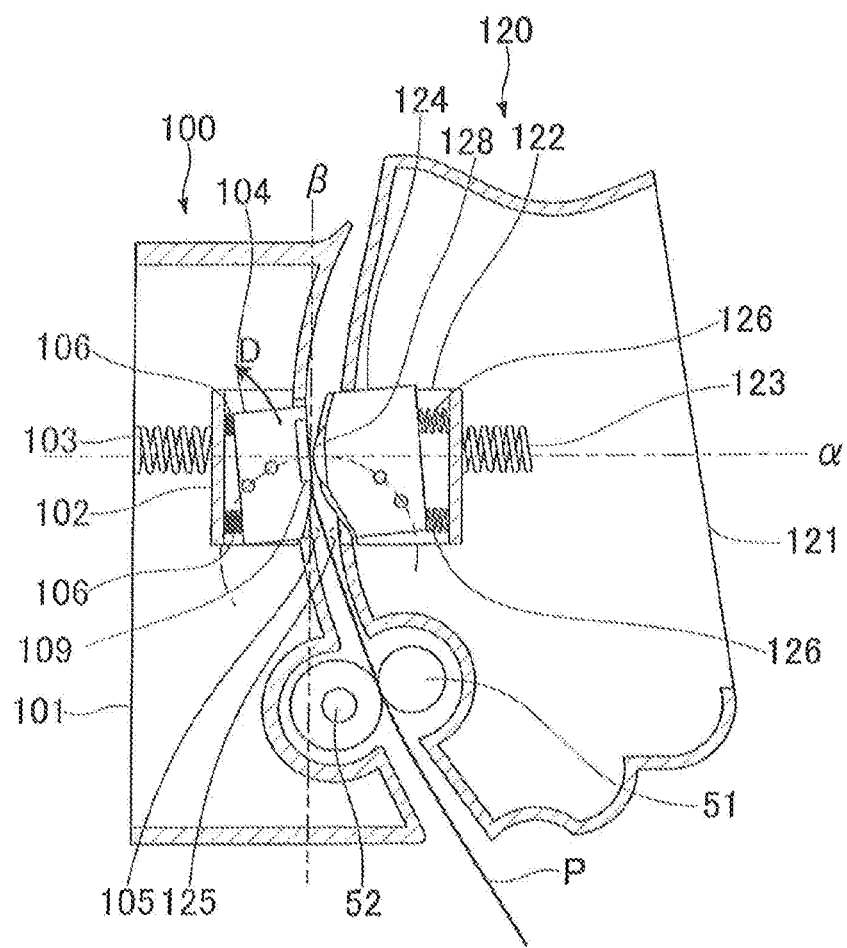
FIG. 7 is a view of the respective units before a recording material having a high rigidity passes through the contact portion in the exemplary embodiment 1.
Figure 8:
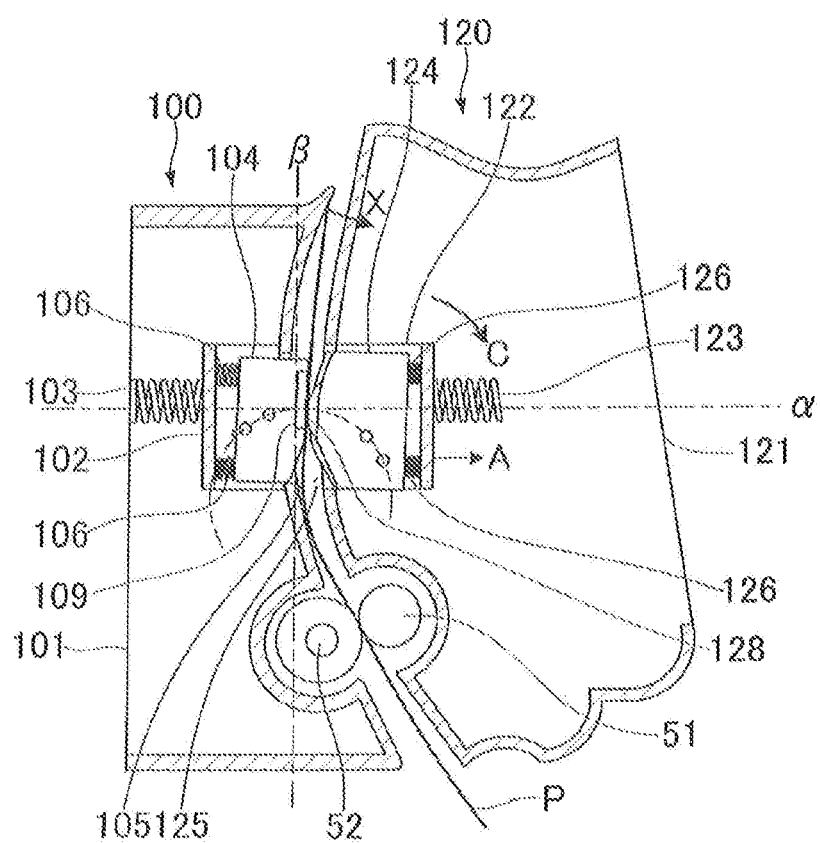
FIG. 8 is a view of the respective units when the recording material having a high rigidity passes through the contact portion in the exemplary embodiment 1.

Next, with reference to FIGS. 7 and 8, it is described about a case where a recording material P has a high rigidity, for example, a case of a recording material having a large basic amount, such as a thick paper or a glossy paper. FIG. 7 illustrates a state of the sensor guide unit 100 and the secondary-transfer-side sensor unit 120 before the recording material P having a high rigidity passes through the contact portion between the sensor holder 104 and the secondary-transfer-side sensor holder 124. The recording material P is conveyed by the registration roller 51 and the opposing registration roller 52, and comes in touch with the sensor holder 104 first. Since the recording material P has a high rigidity, when the recording material P comes in touch with the sensor holder 104, the recording material P overcomes a pressing force of the springs 106 thus pushing back the sensor holder 104. Accordingly, the recording material P causes the sensor holder 104 to rotationally move in the direction indicated by arrow D using the imaginary swing center 105 as an axis of rotation. The secondary-transfer-side sensor holder 124 also rotationally moves in the direction indicated by arrow D using the imaginary swing center 125 as an axis of rotation in conformity with a rotational movement of the sensor holder 104. The recording material P is conveyed to the touch portion (contact portion) between the sensor holder 104 and the secondary-transfer-side sensor holder 124 as it is. In the same manner as the recording material P having a low rigidity, the sensor holder 104 (first contact member) comes into contact with one surface of the recording material P, and the secondary-transfer-side sensor holder 124 (second contact member) comes into contact with the other surface of the recording material P thus pinching the recording material P. In the same manner as the recording material P having a low rigidity, the recording material P is pinched at the nip portion formed by the glass member 109 on the sensor holder 104 side and the driven roller 128 on the secondary-transfer-side sensor holder 124 side.

FIG. 8 illustrates a state of the sensor guide unit 100 and the secondary-transfer-side sensor unit 120 after the recording material P having a high rigidity passes through the contact portion between the sensor holder 104 and the secondary-transfer-side sensor holder 124. When the recording material P is conveyed beyond the contact portion between the sensor holder 104 and the secondary-transfer-side sensor holder 124, a distal end of the recording material P comes in touch with the conveyance guide 101 so that the secondary-transfer-side sensor holder 124 receives a reaction force from the recording material P in a direction indicated by arrow X. Since the recording material P has a large rigidity, a reaction force is also large thus overcoming a pressing force of the springs 126. Accordingly, the recording material P pushes back the secondary-transfer-side sensor holder 124 thus causing the secondary-transfer-side sensor holder 124 to rotationally move in the direction indicated by arrow C using the imaginary swing center 125 as an axis of rotation. At the same time, the recording material P overcomes a pressing force of the spring 123 thus causing the secondary-transfer-side sensor holder guide 122 to move in the direction indicated by arrow A. At this time of operation, the sensor holder 104 changes the attitude following the movement of the recording material P while maintaining pinching of the recording material P in cooperation with the secondary-transfer-side sensor holder 124 due to the pressing force of the spring 103. Then, the recording material P is conveyed toward a nip portion between the intermediate transfer belt 41 and the secondary transfer roller 91. Thereafter, in the same manner as the case of the recording material P having a low rigidity, the recording material P arrives at the nip portion between the intermediate transfer belt 41 and the secondary transfer roller 91 as illustrated in FIG. 6. In such a state, a rear end portion of the recording material P is still nipped by the registration roller 51 and the opposing registration roller 52. At this time of operation, the speed of the intermediate transfer belt 41 and the secondary transfer roller 91 is more affected by a rigidity of the recording material P than by the speed of the registration roller 51 and the opposing registration roller 52. Accordingly, the recording material P is conveyed while maintaining the attitude at the time of arriving at the nip portion between the intermediate transfer belt 41 and the secondary transfer roller 91. Therefore, the attitudes of the sensor holder 104 and the secondary-transfer-side sensor holder 124 do not change either.

In this exemplary embodiment, the imaginary swing center 105 of the sensor holder 104 is disposed as shown in FIGS. 4, 7 and 8. That is, the imaginary swing center 105 is disposed substantially on (in the vicinity of) a second imaginary line β orthogonal to a first imaginary line α which passes a point of contact between the sensor holder 104 and the recording material P, and which extends parallel to an urging direction of the spring 103. Further, the imaginary swing center 105 is disposed on the upstream side of a point of intersection between the first imaginary line α and the second imaginary line β in the conveyance path for the recording material. With such a configuration, a rotationally moving operation of the sensor holder 104 which is caused by the recording material P is stabilized. That is, followability of the line sensor 107a, provided to the sensor holder 104, is enhanced with respect to the attitude of the recording material P and hence, the line sensor 107a can follow the recording material P more easily. Accordingly, even if a conveyance path for a recording material is curved, relative positions including relative distances and relative angles between three points, that is, a portion to be detected on a recording material P, the line sensor 107a and the LED 107c, can be maintained constant. Therefore, it is possible to prevent degradation of determination accuracy of the surface property detection part formed of the line sensor 107a and the LED 107c, both of which are provided to the sensor holder 104.

The imaginary swing center 125 of the secondary-transfer-side sensor holder 124 is disposed in the vicinity of the swing center 105. That is, the sensor holder 104 and the secondary-transfer-side sensor holder 124 pinch a recording material P, and both of a swing center of the sensor holder 104 and a swing center of the secondary-transfer-side sensor holder 124 are disposed at substantially the same position. With such a configuration, in a state where the recording material P is pinched by the sensor holder 104 and the secondary-transfer-side sensor holder 124, the sensor holder 104 and the secondary-transfer-side sensor holder 124 can not only rotate in the direction C and the direction D but also move parallel to the direction A or the direction B due to the spring 103 or the spring 123. Accordingly, when the sensor holder 104 and the secondary-transfer-side sensor holder 124 are affected by the recording material P, it is possible to make the amount of change in attitude of the sensor holder 104 and the amount of change in attitude of the secondary-transfer-side sensor holder 124 substantially equal to each other. Accordingly, it is possible to prevent deviation of the relative position between the ultrasonic receiving part 107b and the ultrasonic transmitting part 127b. Therefore, followability with respect to a recording material is enhanced and hence, it is possible to prevent degradation of determination accuracy of the basic amount detection part, formed of the ultrasonic receiving part 107b and the ultrasonic transmitting part 127b. The degradation of determination accuracy of the basic amount detection part occurs when a relationship between the recording material and the pinching position, at which the recording material is pinched by the sensors, is deviated. In the conventional configuration, an actual swing shaft (swing center) is present, and a touch portion which comes in touch with a recording material swings about the shaft. In this exemplary embodiment, however, an actual swing center is not present. A groove having an arc shape is formed on each of the sensor holder guide 102 and the secondary-transfer-side sensor holder guide 122, and the protrusions formed on the sensor holder 104 and the protrusions formed on the secondary-transfer-side sensor holder 124 respectively slide along the grooves. As a result, the configuration enables the sensor holder 104 and the secondary-transfer-side sensor holder 124 to move as though the actual swing centers 105, 125 are present, and the sensor holder 104 and the secondary-transfer-side sensor holder 124 respectively swing about the swing centers 105, 125. That is, a configuration where the touch portion which comes in touch with a recording material swings is realized in a state where the space for providing the actual swing centers is saved so that the configuration has a reduced size compared to a conventional configuration.

Exemplary Embodiment 2

Configurations and operations substantially equal to those in the exemplary embodiment 1 are given the same reference characters, and the description of such configurations and operations is omitted.

<Description of Configuration of Sensor Guide Unit>

Figure 9A:
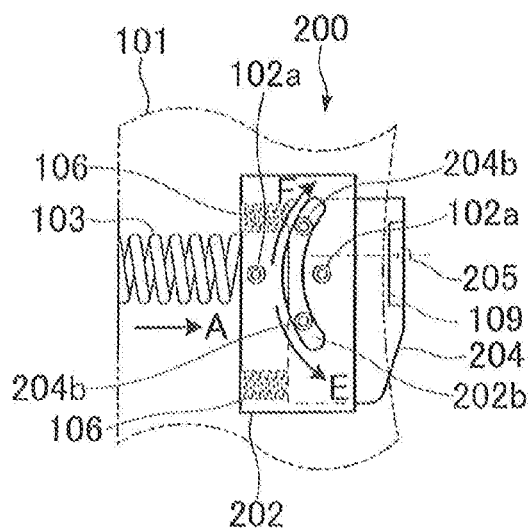
FIG. 9A is a configuration diagram of a sensor holder guide according to an exemplary embodiment 2.

FIG. 9A is a view of a sensor guide unit 200 of an exemplary embodiment 2. As illustrated in FIG. 9A, two protrusions 204b are formed on a sensor holder 204, and a groove 202b is formed on a sensor holder guide 202 (first support member). The two protrusions 204b are inserted into the groove 202b. The groove 202b is formed as if the groove 202b draws an arc shape about an imaginary swing center 205. With such a configuration, the two protrusions 204b are operated (slid) while being guided by the groove 202b so that the sensor holder 204 is rotationally movable in directions indicated by arrows E, F using the swing center 205 as a rotation axis (swing axis). The swing center 205 is disposed at a point which comes in touch with the sensor holder 204 and the recording material P.

<Description of Configuration of Secondary-Transfer-Side Sensor Unit>

Figure 9B:
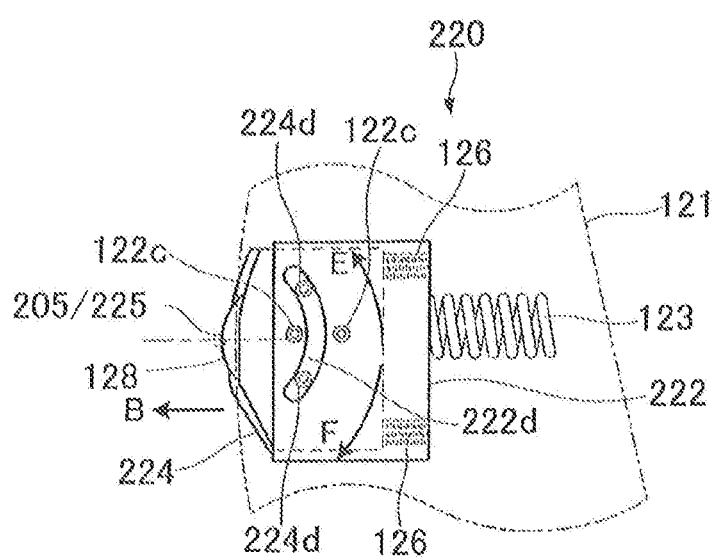
FIG. 9B is a configuration diagram of a secondary-transfer-side sensor holder guide.

FIG. 9B is a view of a secondary-transfer-side sensor unit 220 in the exemplary embodiment 2. As illustrated in FIG. 9B, two protrusions 224d are formed on a secondary-transfer-side sensor holder 224, and a groove 222d is formed on a secondary-transfer-side sensor holder guide 222 (second support member). The two protrusions 224d are inserted into the groove 222d. Accordingly, the groove 222d is formed as if the groove 222d draws an arc shape about an imaginary swing center 225. With such a configuration, the two protrusions 224d are operated (slid) while being guided by the groove 222d so that the secondary-transfer-side sensor holder guide 222 is rotationally movable in the directions indicated by arrows E, F using the swing center 225 as a rotation axis (swing axis). In this embodiment, different from the exemplary embodiment 1, the swing center 225 is disposed at the same position as the swing center 205 of the sensor holder 204. That is, both of an arc shape which the sensor holder 204 draws and an arc shape which the secondary-transfer-side sensor holder 224 draws have the same center position.

<Description of Operation of Sensor Guide Unit and Secondary-Transfer-Side Sensor Unit>

Operation performed in a standby state and operation performed in conveying a recording material P having a low rigidity are substantially equal to those in the exemplary embodiment 1 and hence, detailed description is omitted. In summary, the recording material P having a low rigidity comes in touch with the sensor holder 204 first. The sensor holder 204 is installed to the sensor holder guide 202 in a rotationally movable manner using the swing center 205 as an axis of rotation. However, since the recording material P has a low rigidity, the recording material P cannot overcome a pressing force of the springs 106 so that the sensor holder 204 does not rotationally move. The recording material P is conveyed to the touch portion (contact portion) between the sensor holder 204 and the secondary-transfer-side sensor holder 224 as it is. When the recording material P is conveyed beyond the touch portion between the sensor holder 204 and the secondary-transfer-side sensor holder 224, a distal end of the recording material P comes in touch with the conveyance guide 101 so that the secondary-transfer-side sensor holder 224 receives a reaction force from the recording material P. However, since the recording material P has a low rigidity, a reaction force is also small and hence, the recording material P is conveyed while the sensor holder 204 and the secondary-transfer-side sensor holder 224 maintain the attitudes in the standby state due to the pressing force of the spring 123. Thereafter, the recording material P arrives at a nip between an intermediate transfer belt 41 and a secondary transfer roller 91.

Figure 10:
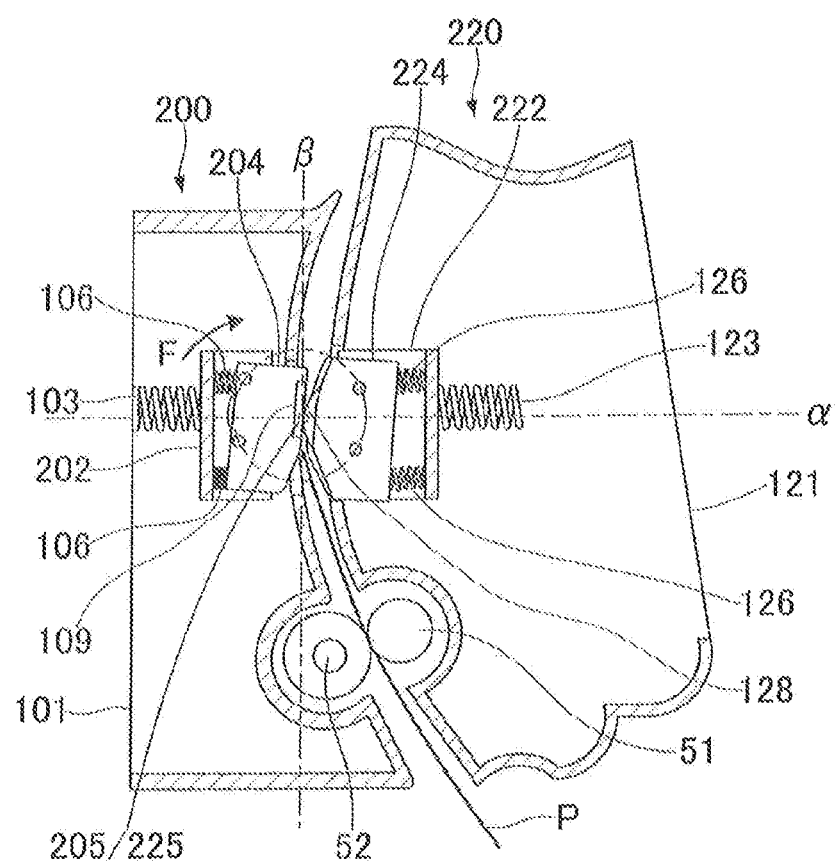
FIG. 10 is a view of respective units before a recording material having a high rigidity passes through a contact portion in the exemplary embodiment 2.

A case where a recording material P having a high rigidity is conveyed in this exemplary embodiment is described with reference to FIGS. 10 to 12. FIG. 10 is a longitudinal cross-sectional view of the sensor guide unit 200, the secondary-transfer-side sensor unit 220 and an area around these units before printing is performed on a recording material and before the recording material P passes through a contact portion between the sensor guide unit 200 and the secondary-transfer-side sensor unit 220. In this embodiment, the recording material P having a high rigidity means a recording material having a large basic amount such as a thick paper or a glossy paper, for example. The recording material P is conveyed by a registration roller 51 and an opposing registration roller 52, and comes in touch with the sensor holder 204 first. Since the recording material P has a high rigidity, when the recording material P comes in touch with the sensor holder 204, the recording material P overcomes a pressing force of the springs 106 thus pushing back a portion of the sensor holder 204 disposed on an upstream side of the swing center 205 in the conveyance path for the recording material P. Accordingly, the recording material P causes the sensor holder 204 to rotationally move in a direction indicated by arrow F using the swing center 205 as an axis of rotation. The secondary-transfer-side sensor holder 224 also rotationally moves in the direction indicated by arrow F in conformity with a rotational movement of the sensor holder 204. The recording material P is conveyed to the touch portion (contact portion) between the sensor holder 204 and the secondary-transfer-side sensor holder 224 as it is. In the same manner as the exemplary embodiment 1, the sensor holder 204 (first contact member) comes into contact with one surface of the recording material P, and the secondary-transfer-side sensor holder 224 (second contact member) comes into contact with the other surface of the recording material P thus pinching the recording material P. In the same manner as the exemplary embodiment 1, the recording material P is pinched by a nip portion formed by a glass member 109 on the sensor holder 204 side and a driven roller 128 on the secondary-transfer-side sensor holder 224 side.

Figure 11:
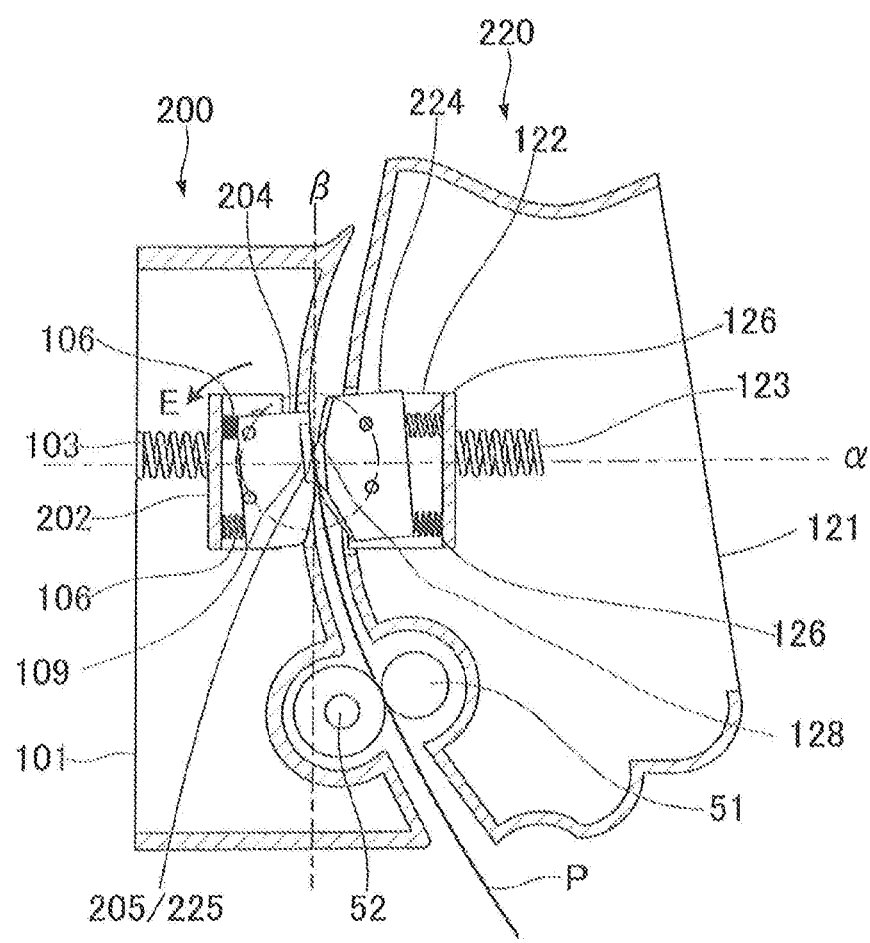
FIG. 11 is a view of the respective units when the recording material having a high rigidity passes through the contact portion in the exemplary embodiment 2.

FIG. 11 illustrates a state of the sensor guide unit 200 and the secondary-transfer-side sensor unit 220 when the recording material P having a high rigidity passes through the contact portion between the sensor holder 204 and the secondary-transfer-side sensor holder 224. When the recording material P is conveyed, the distal end of the recording material P pinched by the nip portion formed by the glass member 109 on the sensor holder 204 side and the driven roller 128 on the secondary-transfer-side sensor holder 224 side is conveyed beyond the swing center 205. At this point of operation, the recording material P pushes back a portion of the sensor holder 204 disposed on the downstream side of the swing center 205 in the conveyance path for the recording material P. Accordingly, a direction of a force applied to the sensor holder 204 changes so that the sensor holder 204 rotationally moves in a direction indicated by arrow E using the swing center 205 as an axis of rotation. The secondary-transfer-side sensor holder 224 also rotationally moves in the direction indicated by arrow E in conformity with a rotational movement of the sensor holder 204.

Figure 12:
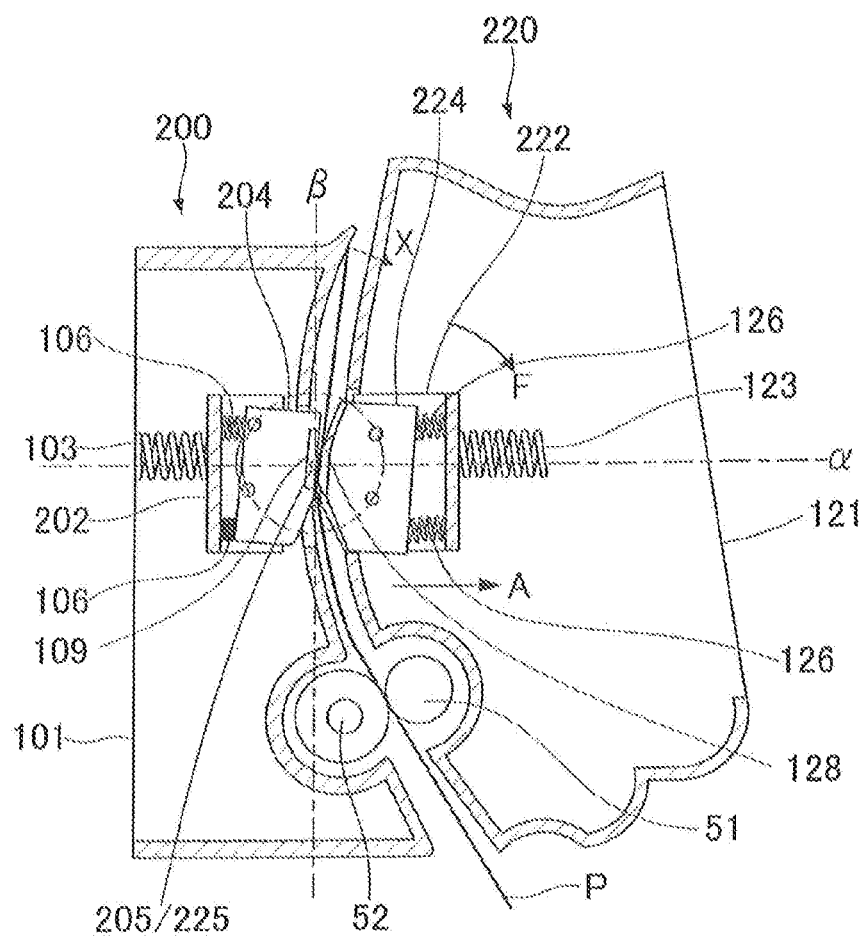
FIG. 12 is a view of the respective units after the recording material having a high rigidity passes through the contact portion in the exemplary embodiment 2.

FIG. 12 illustrates a state of the sensor guide unit 200 and the secondary-transfer-side sensor unit 220 after the recording material P having a high rigidity passes through the contact portion between the sensor holder 204 and the secondary-transfer-side sensor holder 224. When the recording material P is conveyed beyond the swing center 205, the distal end of the recording material P comes in touch with the conveyance guide 101 so that the secondary-transfer-side sensor holder 224 receives a reaction force from the recording material P in a direction indicated by arrow X. Since the recording material P has a large rigidity, a reaction force is also large thus overcoming a pressing force of the springs 126. Accordingly, the recording material P pushes back a portion of the secondary-transfer-side sensor holder 224 disposed on the downstream side of the swing center 225 in the conveyance path for the recording material P thus causing the secondary-transfer-side sensor holder 224 to move in a direction indicated by arrow F using the swing center 225 as an axis of rotation. At the same time, the recording material P overcomes a pressing force of the spring 123 thus causing the secondary-transfer-side sensor holder guide 222 to move in a direction indicated by arrow A. At this time of operation, the sensor holder 204 changes the attitude following the movement of the recording material P while maintaining pinching of the recording material P in cooperation with the secondary-transfer-side sensor holder 224 due to the pressing force of the spring 103. Then, the recording material P is conveyed toward the nip portion between the intermediate transfer belt 41 and the secondary transfer roller 91. That is, the sensor holder 204 rotationally moves in the direction indicated by arrow F in conformity with a rotational movement of the secondary-transfer-side sensor holder 224.

Thereafter, in the same manner as FIG. 6 of the exemplary embodiment 1, the recording material P arrives at the nip portion between the intermediate transfer belt 41 and the secondary transfer roller 91. In this state, a rear end portion of the recording material P is still nipped by the registration roller 51 and the opposing registration roller 52. At this time of operation, the speed of the intermediate transfer belt 41 and the secondary transfer roller 91 is more affected by a rigidity of the recording material P than by the speed of the registration roller 51 and the opposing registration roller 52. Accordingly, the recording material P is conveyed while maintaining the attitude at the time of arriving at the nip portion between the intermediate transfer belt 41 and the secondary transfer roller 91. Therefore, the attitudes of the sensor holder 204 and the secondary-transfer-side sensor holder 224 do not also change.

In this exemplary embodiment, the swing center 205 of the sensor holder 204 is disposed as illustrated in FIGS. 10 to 12. That is, the swing center 205 is disposed on a point of intersection between a first imaginary line a and a second imaginary line β such that the position of the swing center 205 is coincident with the position of the swing center 225 of the secondary-transfer-side sensor holder 224. The first imaginary line α passes a point of contact between the sensor holder 204 and the recording material P, and extends parallel to an urging direction of the spring 103. The second imaginary line β is orthogonal to the first imaginary line α. Accordingly, a swing trajectory of the sensor holder 204 and a swing trajectory of the secondary-transfer-side sensor holder 224 draw arc shapes having the same center. Therefore, followability of the sensor holder 204 and the secondary-transfer-side sensor holder 224 with respect to the recording material P in the attitude under conveyance is further increased compared to the exemplary embodiment 1. As a result, irrespective of a portion of the sensor holder 204 or the secondary-transfer-side sensor holder 224 in the conveyance path, such as a portion of the sensor holder 204 or the secondary-transfer-side sensor holder 224 disposed on the upstream side or the downstream side in a conveyance direction of a recording material, relative positions between three points, that is, the recording material P, a line sensor 107a and an LED 107c, is maintained constant. Further, it is also possible to prevent deviation of the relative position between an ultrasonic receiving part 107b and an ultrasonic transmitting part 127b. Accordingly, it is possible to prevent degradation of recording material determination accuracy of the surface property detection part formed of the line sensor 107a and the LED 107c. The degradation of recording material determination accuracy of the surface property detection part occurs when a relationship between the recording material and the pinching position, at which the recording material is pinched by the sensors, is deviated. It is also possible to prevent degradation of recording material determination accuracy of the basic amount detection part formed of the ultrasonic receiving part 107b and the ultrasonic transmitting part 127b. The degradation of recording material determination accuracy of the basic amount detection part occurs when a positional relationship between the recording material and the sensors is deviated. Further, in the same manner as the exemplary embodiment 1, imaginary swing centers are provided, and the grooves 202b, 222d each having an arc shape are respectively formed on the sensor holder guide 202 and the secondary-transfer-side sensor holder guide 222. The two protrusions 204b formed on the sensor holder 204 and the two protrusions 224d formed on the secondary-transfer-side sensor holder 224 respectively slide along the grooves having an arc shape. As a result, the configuration enables the sensor holder 204 and the secondary-transfer-side sensor holder 224 to move as though the actual swing centers 205, 225 are present, and the sensor holder 204 and the secondary-transfer-side sensor holder 224 respectively swing about the swing centers 205, 225. That is, a configuration where the touch portion which comes in touch with a recording material swings is realized in a state where the space for providing the actual swing centers is saved so that the configuration has a reduced size compared to a conventional configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-166875, filed Aug. 31, 2017, which is hereby incorporated by reference herein in its entirety.

What is claimed is:

1. An image forming apparatus comprising:
an image forming unit configured to form an image on a recording material;
a detection unit configured to detect information on characteristics of the recording material; and
a control unit configured to set an image forming condition of the image forming unit based on the information on the characteristics of the recording material detected by the detection unit,
wherein the detection unit includes a first contact member configured to come into contact with a first surface of the recording material, and a second contact member configured to come into contact with a second surface of the recording material,
wherein in a state where a recording material does not exist, the first contact member is configured to come into contact with the second contact member to form a nip portion so that the first contact member and the second contact member nip a recording material conveyed to the nip portion, at the nip portion,
wherein the first contact member and the second contact member are movable in a direction in which the first contact member and the second contact member nip the recording material, and rotatable about an axis line extending in a predetermined direction, the predetermined direction being orthogonal to the direction in which the first contact member and the second contact member are movable and being orthogonal to a conveyance direction of the recording material,
wherein when the recording material conveyed in the conveyance direction is nipped by the first contact member and the second contact member, the first contact member and the second contact member rotate in a same direction,
wherein each of the first contact member and the second contact member includes a protrusion, wherein the image forming apparatus includes a first support member configured to support the first contact member, the first support member having a groove into which the protrusion of the first contact member is inserted to guide the protrusion so as to rotate the first contact member about an axis line extending in the predetermined direction, and a second support member configured to support the second contact member, the second support member having a groove into which the protrusion of the second contact member is inserted to guide the protrusion so as to rotate the second contact member about an axis line extending in the predetermined direction, and wherein a rotation center of the first contact member and a rotation center of the second contact member are disposed at substantially the same position.

2. The image forming apparatus according to claim 1, wherein the rotation center of the first contact member and the rotation center of the second contact member overlap with a conveyance path for the recording material when viewed in the predetermined direction.

3. The image forming apparatus according to claim 2, wherein the rotation center of the first contact member and the rotation center of the second contact member are disposed on an upstream side from a contact portion in the conveyance direction when viewed in the predetermined direction, wherein the first contact member and the second contact member nip the recording material at the contact portion.

4. The image forming apparatus according to claim 2, wherein the rotation center of the first contact member and the rotation center of the second contact member are disposed at a position equal to a contact portion when viewed in the predetermined direction, wherein the first contact member and the second contact member nip the recording material at the contact portion.

5. The image forming apparatus according to claim 1, wherein the first contact member and the second contact member are urged by the first support member and the second support member in a direction in which the first contact member and the second contact member come into contact with each other, and at least one of the rotation center of the first contact member and the rotation center of the second contact member is positioned substantially on a second imaginary line orthogonal to a first imaginary line which passes a contact portion and which extends to an urging direction in which the first contact member and the second contact member are urged when viewed in the predetermined direction, wherein the first contact member and the second contact member nip the recording material at the contact portion.

6. The image forming apparatus according to claim 5, at least one of the rotation center of the first contact member and the rotation center of the second contact member is positioned on an upstream side from a point of intersection between the first imaginary line and the second imaginary line in the conveyance direction when viewed in the predetermined direction.

7. The image forming apparatus according to claim 5, wherein at least one of the rotation center of the first contact member and the rotation center of the second contact member is positioned on a point of intersection between the first imaginary line and the second imaginary line when viewed in the predetermined direction.

8. The image forming apparatus according to claim 1, wherein the first contact member includes an ultrasonic receiving unit, and the second contact member includes an ultrasonic transmitting unit, wherein an ultrasonic wave transmitted by the ultrasonic transmitting unit is transmitted through the recording material, and is received by the ultrasonic receiving unit, and the control unit sets the image forming condition based on an amplitude of the ultrasonic wave received by the ultrasonic receiving unit.

9. The image forming apparatus according to claim 1, wherein the first contact member includes a light emitting unit, and the second contact member includes a light receiving unit, wherein light emitted from the light emitting unit is transmitted through the recording material, and is received by the light receiving unit, and the control unit sets the image forming condition based on the light which is received by the light receiving unit.

10. The image forming apparatus according to claim 1, wherein the first contact member includes a light emitting unit and a light receiving unit, wherein light emitted from the light emitting unit is reflected on the recording material, and is received by the light receiving unit, and the control unit sets the image forming condition based on the light which is received by the light receiving unit.

11. The image forming apparatus according to claim 1, wherein the image forming condition is a conveyance speed of a recording material, a value of voltage to be applied to a transferring unit included in the image forming unit, or a temperature at which a fixing unit included in the image forming unit performs fixing of an image on a recording material.

12. The image forming apparatus according to claim 1, wherein the first support member and the second support member are provided on an imaginary arc shape.

13. A recording material determination apparatus comprising:

a detection unit configured to detect information on characteristics of a recording material; and a control unit configured to determine a type of the recording material based on the information on the characteristics of the recording material detected by the detection unit, wherein the detection unit includes a first contact member configured to come into contact with a first surface of the recording material, and a second contact member configured to come into contact with a second surface of the recording material, wherein in a state where a recording material does not exist, the first contact member is configured to come into contact with the second contact member to form a nip portion so that the first contact member and the second contact member nip a recording material conveyed to the nip portion, at the nip portion, wherein the first contact member and the second contact member are movable in a direction in which the first contact member and the second contact member nip the recording material, and rotatable about an axis line extending in a predetermined direction, the predetermined direction being orthogonal to the direction in which the first contact member and the second contact member are movable and being orthogonal to a conveyance direction of the recording material, wherein when the recording material conveyed in the conveyance direction is nipped by the first contact member and the second contact member, the first contact member and the second contact member rotate in a same direction, wherein each of the first contact member and the second contact member includes a protrusion, wherein the recording material determination apparatus includes a first support member configured to support the first contact member, the first support member having a groove into which the protrusion of the first contact member is inserted to guide the protrusion so as to rotate the first contact member about an axis line extending in the predetermined direction, and a second support member configured to support the second contact member, the second support member having a groove into which the protrusion of the second contact member is inserted to guide the protrusion so as to rotate the second contact member about an axis line extending in the predetermined direction, and wherein a rotation center of the first contact member and a rotation center of the second contact member are disposed at substantially the same position.

14. The recording material determination apparatus according to claim 13, wherein the first contact member includes an ultrasonic receiving unit, and the second contact member includes an ultrasonic transmitting unit, wherein an ultrasonic wave transmitted by the ultrasonic transmitting unit is transmitted through the recording material, and is received by the ultrasonic receiving unit, and the control unit determines the type of the recording material based on an amplitude of the ultrasonic wave received by the ultrasonic receiving part.

15. The recording material determination apparatus according to claim 13, wherein the first contact member includes a light emitting unit, and the second contact member includes a light receiving unit, wherein light emitted from the light emitting unit is transmitted through the recording material, and is received by the light receiving unit, and the control unit determines the type of the recording material based on the light which is received by the light receiving unit.

16. The recording material determination apparatus according to claim 13, wherein the first contact member includes a light emitting unit and a light receiving unit, wherein light emitted from the light emitting unit is reflected on the recording material, and is received by the light receiving unit, and the control unit determines the type of the recording material based on the light which is received by the light receiving unit.

17. The recording material determination apparatus according to claim 13,
wherein the first support member and the second support member are provided on an imaginary arc shape.

* * * * *